United States Patent
Meiners

(10) Patent No.: US 6,731,525 B2
(45) Date of Patent: *May 4, 2004

(54) H-BRIDGE ELECTRONIC PHASE CONVERTER

(75) Inventor: Larry Gene Meiners, Rapid City, SD (US)

(73) Assignee: Phase Technologies, LLC., Rapid City, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/306,032

(22) Filed: Nov. 27, 2002

(65) Prior Publication Data

US 2003/0099124 A1 May 29, 2003

Related U.S. Application Data

(60) Provisional application No. 60/334,418, filed on Nov. 28, 2001.

(51) Int. Cl.[7] ............................. H02M 1/12; H02M 1/14
(52) U.S. Cl. ..................... 363/148; 363/149; 363/38; 363/39; 363/40
(58) Field of Search ........................ 363/36, 37, 40, 363/148, 149

(56) References Cited

U.S. PATENT DOCUMENTS

| | | |
|---|---|---|
| 3,673,480 A | 6/1972 | Johnstone |
| 4,492,911 A | 1/1985 | Moliter |
| 4,656,575 A | 4/1987 | West |
| 4,777,421 A | 10/1988 | West |
| 4,849,950 A | 7/1989 | Sugiura et al. |
| 4,855,652 A | 8/1989 | Yamashita et al. |
| 4,978,894 A | 12/1990 | Takahara |
| 5,065,305 A | 11/1991 | Rich |
| 5,187,654 A | 2/1993 | Felippe |
| 5,293,108 A | 3/1994 | Spudich |
| 5,621,296 A | 4/1997 | Werner et al. |
| 5,793,623 A | 8/1998 | Kawashima et al. |
| 6,297,971 B1 | 10/2001 | Meiners |
| 6,353,545 B1 * | 3/2002 | Ueda ........................... 363/40 |
| 6,459,597 B1 * | 10/2002 | Igarashi et al. ................ 363/39 |
| 6,542,390 B2 * | 4/2003 | Bixel ........................... 363/71 |
| 6,556,458 B2 * | 4/2003 | Ohmura et al. ................ 363/37 |

* cited by examiner

Primary Examiner—Bao Q. Vu
(74) Attorney, Agent, or Firm—Ancel W. Lewis, Jr.

(57) ABSTRACT

A phase converter that converts single phase AC electric power to balanced three phase AC power. Two input terminals are connectable to a single phase AC power source, and connect directly to two output terminals of the converter. The phase converter has a storage capacitor, a charging circuit for controlled charging the storage capacitor and an output circuit for controlled discharge of the storage capacitor to provide single phase AC power to a third output terminal. The charging circuit controls input to the storage capacitor to provide a sinusoidal input current and to step up the voltage to the storage capacitor. The output circuit provides output power to the third output terminal of a predetermined phase and amplitude, relative to the other two output terminals, to result in balanced three phase AC power at the three output terminals.

12 Claims, 6 Drawing Sheets

H-BRIDGE ELECTRONIC PHASE CONVERTER

This application claims the benefit under 35 U.S.C. §119(e) of the U.S. provisional patent application No. 60/334,418 filed Nov. 28, 2001.

TECHNICAL FIELD

The present invention relates to phase converters and more particularly to a phase converter for that uses one or more H bridges for converting single phase AC power to three phase AC power.

BACKGROUND ART

Three phase AC motors are generally simpler, more reliable and more efficient than single phase AC motors. In addition to three phase AC motors, much high-power industrial equipment requires three phase AC power. Three phase AC power is generally supplied to industrial areas. However, only single phase AC power is available to most residential and rural areas.

The single phase AC power available in most residential and rural areas is provided by a step down transformer connected a high voltage line and, in the United States, is normally supplied as about 240 volts at 60 Hz between the first and second input lines. The transformer is generally center tapped with a neutral line to provide two phases of about 120 volts that are separated by 180 degrees.

Phase converters and inverters convert single phase AC power to three phase AC power to power three phase motors. Phase converters generate a second voltage that is out of phase with the input voltage. The first phase is the voltage between the first and second input line, the second phase is the voltage between the first input line and the second voltage and the third phase is the voltage between the second input line and the second voltage. Three equal phases spaced 120 degrees apart are provided if the second voltage has an amplitude of √3/2 times the amplitude of the input voltage and is 90 degrees out of phase with the input voltage.

The two types of phase converters generally available are the static phase converter and the rotary phase converter. In prior known static phase converters for use with inductive loads two terminals from the input supply were connected to two of the windings of a three phase motor and a capacitor was connected in series between the third winding and one of the terminals from the input supply. The capacitor in combination with the inductive load creates a lead circuit to provide the out of phase second voltage.

Such phase converters are disclosed in U.S. Pat. No. 4,492,911 to Molitor, U.S. Pat. No. 4,777,421 to West, U.S. Pat. No. 3,673,480 to Johnstone and U.S. Pat. No. 5,621,296 to Werner et al. This type of phase converter includes a large capacitor for starting the motor and a smaller capacitor for running the motor. This type of phase converter is relatively inexpensive, however this type of phase converter can only be used with inductive loads. The capacitor must be selected for the specific inductive load to provide the correct phase shift. Also, the amplitude of the voltage out of the capacitor is at most one half the input voltage so this type of phase converter cannot provide balanced currents to the windings at varying loads. Unbalanced currents cause localized heating so that three phase motors run with this type of static phase converter can only be run at a fraction of the rated capacity.

U.S. Pat. No. 5,293,108 to Spudich discloses a static phase converter that includes a balancing coil between the two input lines and a capacitor connected between one input line and the third winding to shift the phase. As in the previously described static phase converters, two terminals from the input supply were connected to the first and second windings of a three phase motor, and a start capacitor and a smaller run capacitor are provided. The balancing coil and capacitor must be selected to match the impedance of the three phase load with this converter.

Rotary phase converters use motor-generators powered by single phase AC power to generate the second voltage signal. Rotary phase converters are disclosed in U.S. Pat. No. 4,656,575 to West, U.S. Pat. No. 5,065,305 to Rich, and U.S. Pat. No. 5,187,654 to Felippe. Rotary phase converters are generally more complex, more expensive and less efficient than static phase converters, and produce an unbalanced output which causes severe imbalances in the phase currents of three phase motors.

Inverters convert the entire single phase AC input voltage to a DC voltage with rectifiers and convert the DC voltage into three balanced AC phases with an inverter circuit. Examples of inverters are disclosed in U.S. Pat. No. 4,855,652 to Yamashita et al., U.S. Pat. No. 5,793,623 to Kawashima et al., U.S. Pat. No. 4,849,950 to Sugiura et al. and U.S. Pat. No. 4,978,894 to Takahara. The inverter circuit requires a minimum of six transistors and six diodes as well as control electronics for all of the transistors. Inverters are generally more complex and more expensive than static phase converters. Since the entire single phase AC input voltage is converted to DC, inverters are inherently less efficient than static phase converters. The output voltage of inverters consists of a pulse-width-modulated (PWM) signal with a high harmonic content, limiting their application to inductive loads. The high frequency harmonics present in the output voltages cause unwanted reflections in the wires connecting the inverter to the motor load, and limit the acceptable distance between the inverter and the motor.

U.S. Pat. No. 6,297,971 to Meiners, incorporated herein by reference, discloses a phase converter that draws a sinusoidal current from the power source and provides sinewave voltages to all terminals.

DISCLOSURE OF THE INVENTION

A phase converter for converting single phase AC power to balanced three phase power AC includes a charging circuit, a storage capacitor, an output circuit and a controller. The charging circuit is connected to an AC power source and includes means for rectifying and stepping up the input voltage to charge the storage capacitor. The charging circuit includes switches that are switched by control electronics at a relatively high frequency with a selected variable duty cycle to provide a sinusoidal input current from the AC power source. The output circuit includes first, second and third output terminals and means, connected to the storage capacitor and to the third output terminal, for providing a selected AC output power signal to the third output terminal from the storage capacitor. The first output terminal connects to the first input terminal from the AC power source and the second output terminal connects to the second input terminal from the AC power source.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
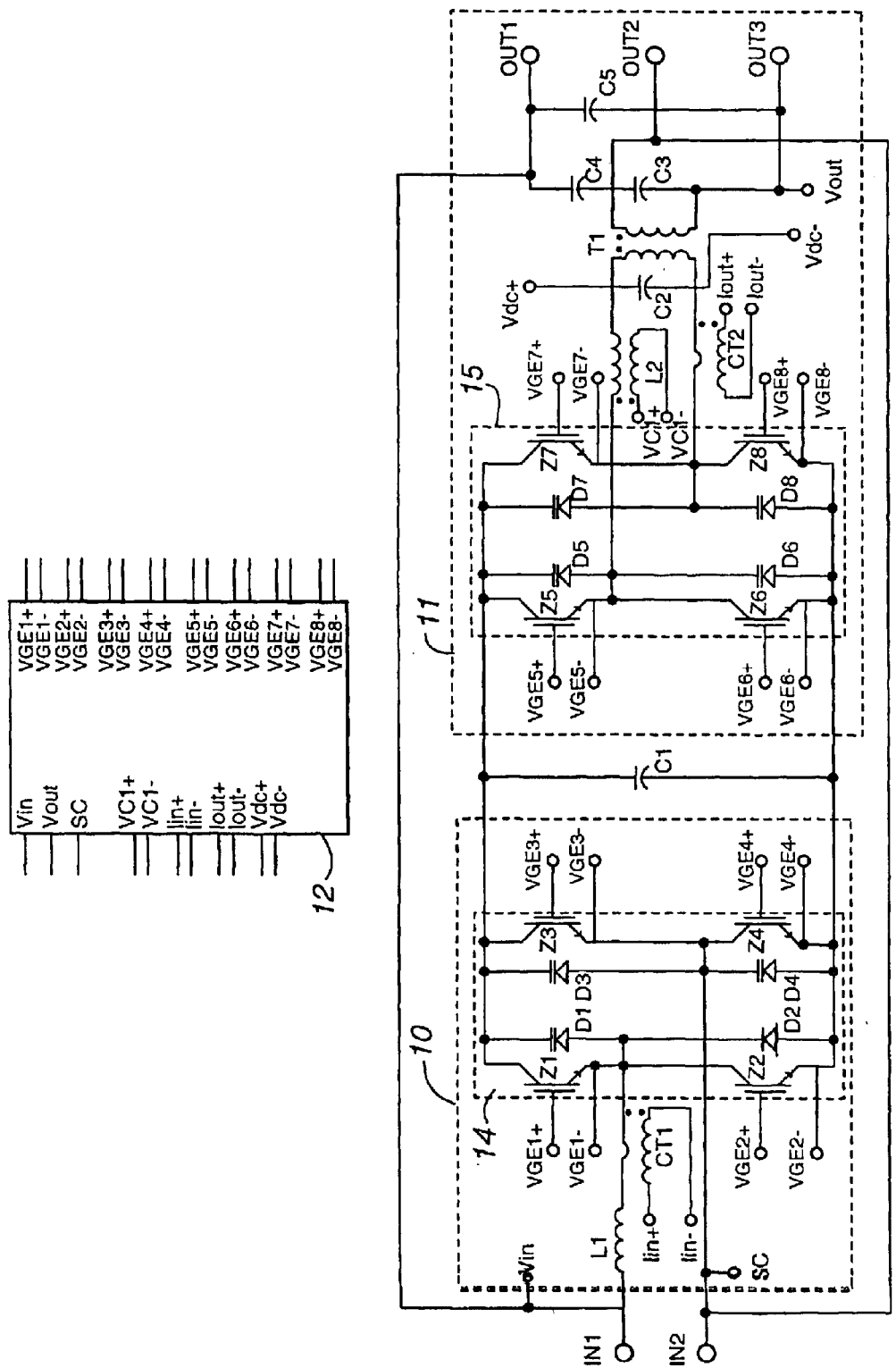
FIG. 1 is a schematic circuit diagram of a phase converter embodying the features of the present invention.

Referring to FIG. 1, a phase converter embodying features of the present invention includes first and second input terminals IN1 and IN2, first, second and third output terminals OUT1, OUT2 and OUT3, a means for storing electricity in the form of a first capacitor C1, a first circuit means for charging the first capacitor in the form of a charging circuit 10 from the first and second input terminals IN1 and IN2, a second circuit means for supplying a third phase to the third output terminal OUT3 in the form of an output circuit 11, and a controller 12. The first and second input terminals IN1 and IN2 are generally connected to an electrical single phase alternating current (AC) voltage source such as a socket or two terminals connected to a utility company step-down transformer. In the illustrated embodiment the voltage between first and second input terminals IN1 and IN2 may be 480 VAC. Other voltages are suitable. The end of the capacitor C1 that is positively charged by the charging circuit will hereinafter be designated the positive end and the opposite end will be designated the negative end. Preferably, the storage capacitor C1 is an electrolytic capacitor having a positive and a negative end.

The charging circuit 10 has an input H bridge 14, a first inductor L1 and a first current transducer CT1. The input H bridge 14 includes first, second, third and fourth input switches, shown as first, second, third and fourth input transistors Z1, Z2, Z3 and Z4, first, second, third and fourth input diodes D1, D2, D3, and D4 The first current transducer CT1 may be a current transformer, a Hall-effect current sensor or other device. In the illustrated embodiment the first current transducer has a primary winding and a secondary winding. One end of the first inductor L1 is connected to the first input terminal IN1 and the other end of the first inductor L1 is connected to one end of the primary winding of the first current transducer CT1.

The anode of the first input diode D1, the cathode of the second input diode D2, the emitter of the first input transistor Z1 and the collector of the second input transistor Z2 all are connected to the other end of the primary winding of the first current transducer CT1. The cathode of the first input diode D1 and the collector of the first input transistor Z1 are connected to the positive end of the first capacitor C1. The anode of the second input diode D2 and the emitter of the second input transistor Z2 are connected to the negative end of the first capacitor C1.

The anode of the third input diode D3, the cathode of the fourth input diode D4, the emitter of the third input transistor Z3 and the collector of the fourth input transistor Z4 all are connected to the second input terminal IN2. The cathode of the third input diode D3 and the collector of the third input transistor Z3 are connected to the positive end of the first capacitor C1. The anode of the fourth input diode D4 and the emitter of the fourth input transistor Z4 are connected to the negative end of the first capacitor C1.

The output circuit 11 has an output H bridge, a second inductor L2, a second current transducer CT2, a transformer T1, second, third, fourth and fifth capacitors C2, C3, C4 and C5, and first, second and third output terminals OUT1, OUT2 and OUT3. The output H bridge includes first, second, third and fourth output switches, shown as first, second, third and fourth output transistors Z5, Z6, Z7 and Z8, and first, second, third and fourth output diodes D5, D6, D7 and D8. The second inductor L2 and the second current transformer each include a primary winding and a secondary winding. The cathodes of the first and third output diodes D5 and D7 and the collectors of the first and third output transistors Z5 and Z7 are connected to the positive end of the first capacitor C1. The anodes of the second and fourth output diodes D6 and D8 and the emitters of the second and fourth output transistors Z6 and Z8 are connected to the negative end of the first capacitor C1.

The anode of the first output diode D5, the cathode of the second output diode D6, the emitter of the first output transistor Z5 and the collector of the second output transistor Z6 are connected to one end of the primary winding of the second inductor L2. The other end of the primary winding of the second inductor L2 is connected to one end of the second capacitor C2 and to one end of the primary winding of the transformer T1. The anode of the third output diode D7, the cathode of the fourth output diode D8, the emitter of the third output transistor Z7 and the collector of the fourth output transistor Z8 are connected to one end of the primary winding of the second current transducer CT2. The other end of the primary winding of the second current transducer CT2 is connected to the other end of the second capacitor C2 and the other end of the primary winding of the transformer T1.

One end of the secondary winding of the transformer T1 and one end of the third capacitor C3 are connected to the second output terminal OUT2 and to one end of the fourth capacitor C4. The other end of the fourth capacitor C4 is connected to the first output terminal OUT1. The other end of the secondary winding of the transformer T1 and the other end of the third capacitor C3 are connected to the third output terminal T3. One end of the fifth capacitor C5 is connected to the first output terminal OUT1 and the other end of the fifth capacitor C5 is connected to the third output terminal OUT3. The first input terminal IN1 is connected to the first output terminal OUT1 and the second input terminal IN2 is connected to the second output terminal OUT2.

The controller 12 includes a plurality of connections to the above described circuit that are described by way of example, and not as a limitation, hereinafter as terminals. The first, second, third, and fourth positive transistor terminals VGE1+, VGE2+, VGE3+, and VGE4+ are connected to the gates of the first, second, third and fourth input transistors Z1, Z2, Z3 and Z4. The first, second, third and fourth negative transistor terminals VGE1−, VGE2−, VGE3− and VGE4− are connected to the emitters of the first, second, third and fourth input transistors Z1, Z2, Z3 and Z4. The fifth, sixth, seventh and eighth positive transistor terminals VGE5+, VGE6+, VGE7+, and VGE8+ are connected to the gates of the first, second, third and fourth output transistors Z5, Z6, Z7 and Z8. The fifth, sixth, seventh and eighth negative transistor terminals VGE5−, VGE6−, VGE7−, and VGE8− are connected to the emitters of the first, second, third and fourth output transistors Z5, Z6, Z7 and Z8.

The voltage in terminal Vin is connected to the first input terminal IN1, the voltage out terminal Vout is connected to the third output terminal OUT3 and the signal common terminal SC is connected to the second input terminal IN2. The positive and negative current in terminals Iin+ and Iin− are connected to opposite ends of the secondary winding of the first current transducer CT1. The positive and negative current out terminals Iout+ and Iout− are connected to opposite ends of the secondary winding of the second current transducer CT1. The positive and negative first capacitor voltage terminals VC1+ and VC1− are connected to opposite ends of the secondary winding of the second inductor L2. The positive and negative transformer voltage terminals Vdc+ and Vdc− are connected to opposite ends of the primary winding of the transformer T1.

Figure 2:
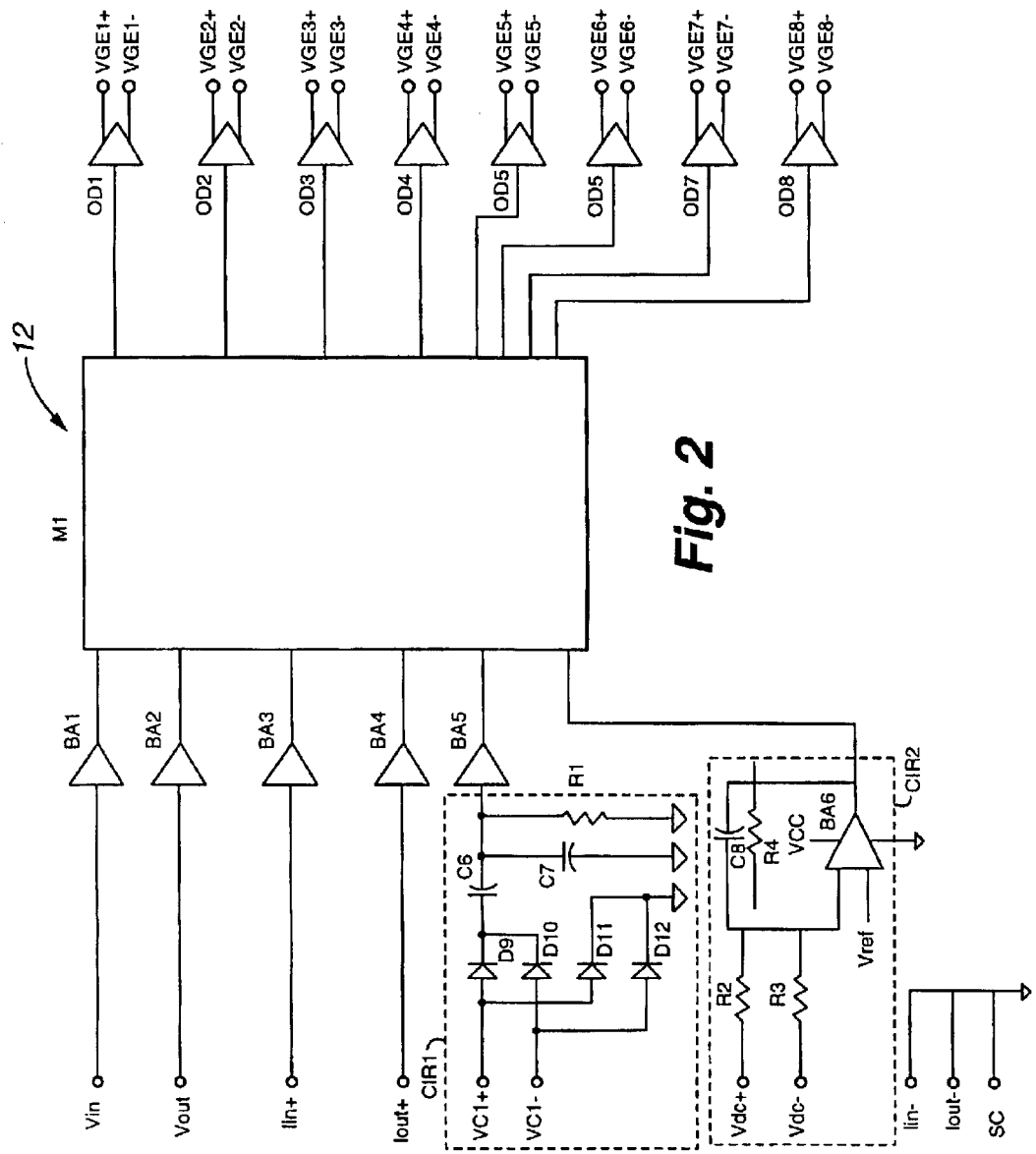
FIG. 2 is a detailed schematic circuit diagram of the controller of FIG. 1.

As shown in FIG. 2, controller 12 includes a microcontroller M1, first, second, third, fourth and fifth buffer amplifiers BA1, BA2, BA3, BA4 and BA5, a first input circuit CIR1, a second input circuit CIR2, and first, second, third, fourth, fifth, sixth, seventh and eighth output drivers OD1, OD2, OD3, OD4, OD5, OD6, OD7 and OD8. The input of the first buffer amplifier BA1 is connected to the voltage in terminal Vin and the output of the first buffer amplifier BA1 is connected to the microcontroller M1. The input of the second buffer amplifier BA2 is connected to the voltage out terminal Vout and the output of the second buffer amplifier BA2 is connected to the microcontroller M1.

The input of the third buffer amplifier BA3 is connected to the positive current in terminal Iin+ and the output of the third buffer amplifier BA3 is connected to the microcontroller M1. The input of the fourth buffer amplifier BA4 is connected to the positive current out terminal Iout+ and the output of the fourth buffer amplifier BA4 is connected to the microcontroller M1. The input of the fifth buffer amplifier BA5 is connected to the first input circuit CIR1 and the output of the fifth buffer amplifier BA5 is connected to the microcontroller M1.

The first input circuit CIR1 includes a first resistor R1, first, second, third and fourth controller diodes D9, D10, D11, D12, and sixth and seventh capacitors C6 and C7. The anode of the first controller diode D9 and the cathode of the third controller diode D11 are connected to the positive first capacitor voltage terminal VC1+, and the anode of the second controller diode D10 and the cathode of the fourth controller diode D12 are connected to the negative first capacitor voltage terminal VC1−. The sixth capacitor C6 is connected between the cathodes of the first and second controller diodes D9 and D10, and the input to the fifth buffer amplifier BA5. The anodes of the third and fourth controller diodes D11 and D12 are connected to ground. The seventh capacitor C7 and the first resistor R1 each connect between the input to the fifth buffer amplifier BA5 and ground.

The second input circuit CIR2 includes second, third and fourth resistors R2, R3 and R4, an eighth capacitor C8 and a sixth buffer amplifier BA6. One end of the second resistor R2 is connected to the positive transformer voltage terminal Vdc+ and one end of the third resistor R3 is connected to the negative transformer voltage terminal Vdc−. The other ends of the second and third resistors R2 and R3 are each connected to one end of the fourth resistor R4, one end of the eighth capacitor C8 and to the negative input of the sixth buffer amplifier BA6. The positive input of the sixth buffer amplifier BA6 is connected to Vref, and the controls of the sixth buffer amplifier BA6 are connected to Vcc and ground. The other ends of the fourth resistor R4 and the eighth capacitor C8, and the output of the sixth buffer amplifier BA6 are connected together to the microcontroller M1.

The inputs of the first, second, third, fourth, fifth, sixth, seventh and eighth output drivers OD1, OD2, OD3, OD4, OD5, OD6, OD7 and OD8 are each connected to the microcontroller M1. The positive outputs of the first, second, third, fourth, fifth, sixth, seventh and eighth output drivers OD1, OD2, OD3, OD4, OD5, OD6, OD7 and OD8 are connected to the first, second, third, fourth, fifth, sixth, seventh and eighth positive transistor terminals VGE1+, VGE2+, VGE3+, VGE4+, VGE5+, VGE6+, VGE7+, and VGE8+, respectively. The negative outputs of the first, second, third, fourth, fifth, sixth, seventh and eighth output drivers OD1, OD2, OD3, OD4, OD5, OD6, OD7 and OD8 are connected to the first, second, third, fourth, fifth, sixth, seventh and eighth negative transistor terminals VGE1−, VGE2−, VGE3−, VGE4−, VGE5−, VGE6−, VGE7−, and VGE8−, respectively. The negative current in terminal Iin−, the negative current out terminal Iout− and the signal common terminal SG are connected to ground.

Referring to FIGS. 1 and 2, the first, second third and fourth input diodes D1, D2, D3 and D4 rectify input voltage and charge the first capacitor C1. During the input positive half cycle, when the voltage at the first input terminal IN1 is greater that the voltage at the second input terminal, current flows through the first and fourth input diodes D1 and D4. During this input positive half cycle, the third input transistor Z3 is switched on and off at a high frequency with a variable duty cycle with pulse width modulation (PWM) to induce current flow through the first inductor L1. The PWM switching of the third input transistor Z3 in combination with the first inductor L1 can charge the first capacitor C1 above maximum voltage between the first and second input terminals IN1 and IN2 and the PWM duty cycles are selected to provide a sinewave current flow through the first inductor L1, as fully described in U.S. Pat. No. 6,297,971. During the input negative half cycle, the fourth input transistor Z4 is switched with PWM.

Power can be directed from the first capacitor C1 back through the first and second input terminals IN1 and IN2 to the voltage source by closing the fourth input transistor Z4 and PWM switching the first input transistor Z1 during the input positive half cycle, and closing the third input transistor Z3 and PWM switching the second input transistor Z2 during the input negative half cycle. The input H Bridge 14 in combination with the first inductor L1 controllably charges the first capacitor C1 while providing a sinewave input current and controllably directs power from the first capacitor C1 back to the voltage source as needed.

The output circuit 11 functions in a similar fashion. During the output positive half cycle, when the voltage supplied to the third output terminal OUT3 is positive, the first output transistor Z5 is turned on and the fourth output transistor Z8 is PWM switched to provide a sinusoidal positive voltage at the third output terminal OUT3. During the output negative half cycle the second output transistor Z6 is closed and the third output transistor Z7 is PWM switched, reversing the direction of current flow through the transformer T1 and providing a sinusoidal negative voltage to the third output terminal OUT3. The first, second, third and fourth output diodes D5, D6, D7 and D8 form a full-wave rectifier bridge so that when the voltage across the load is greater than the voltage across the first capacitor C1, power will be fed back to the first capacitor C1.

The controller 12 monitors the input and output voltages and currents, and switches the first, second, third and fourth input and output transistors Z1, Z2, Z3, Z4, Z5, Z6, Z7 and Z8 appropriately. The input voltage is sampled at the voltage in terminal Vin, and the generated phase is sampled at the voltage out terminal Vout. The signal common terminal SC is used for the reference point. The current through the first inductor L1 is measured using the first current transducer CT1 and the second current transducer CT2 measures the current through the second inductor L2.

The peak-to-peak value of the high frequency signal across the second inductor L2 is exactly equal to the DC value of the voltage across the first capacitor C1. The voltage across the first capacitor C1 is measured by applying the signal across the first capacitor voltage terminals VC1+ and VC1−, which are connected to opposite ends of the secondary winding of the second inductor L2, to the full-wave rectifier of the first input circuit CIR1. The high-pass filter, in the first input circuit CIR1, at the rectifier output gives a DC voltage directly proportional to the first capacitor C1 voltage which can then be referenced to the signal common terminal SC and measured by the microprocessor M1. The same result could be obtained by using a secondary coil on the first inductor L1. The second input circuit CIR2 provides the integral of the voltage across the primary winding of the transformer T1, to assure that the transformer T1 voltage has an average value of zero.

Typically the controller 12 would produce a PWM frequency between 1 kHz and 100 kHz. The controller 12 also senses for overload conditions in the input and output current and in the individual transistors and adjusts the transistor modulation to limit the transistor current to safe values.

Figure 3:
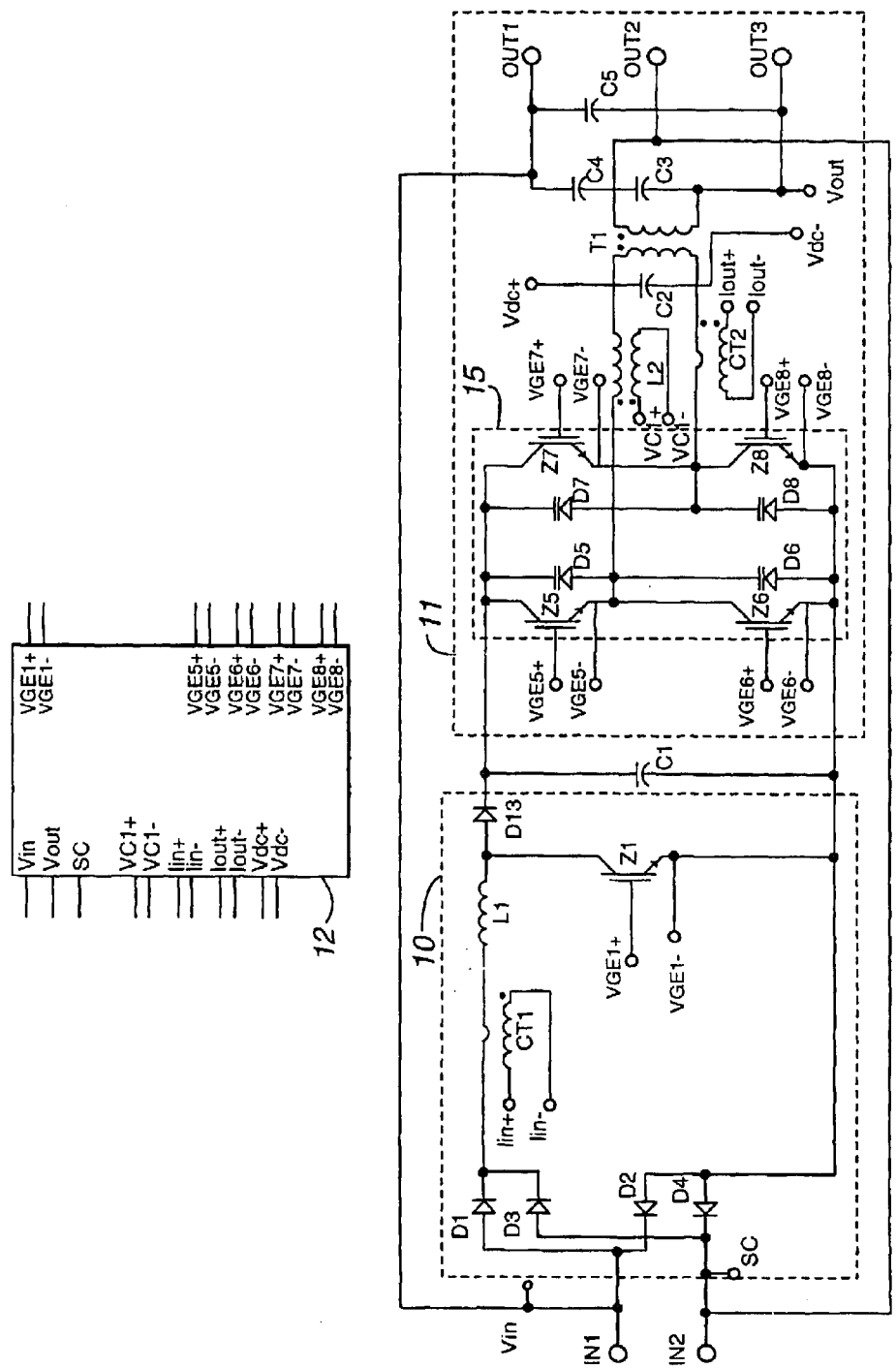
FIG. 3 is a schematic circuit diagram of an another phase converter embodying the features of the present invention.

FIG. 3 shows a phase converter embodying features of the present invention, with an alternative charging circuit 10 having the first, second, third and fourth input diodes D1, D2, D3 and D4, the first current transducer CT1, the first inductor L1, the first input transistor Z1, and a fifth input diode D13. The anode of the first input diode D1 and the cathode of the second input diode D2 are connected to the first input terminal IN1. The anode of the third input diode D3 and the cathode of the fourth input diode D4 are connected to the second input terminal IN2.

The cathodes of the first and third input diodes D1 and D3 are connected to one end of the first current transducer CT1. The other end of the first current transducer CT1 is connected to one end of the first inductor L1. The other end of the first inductor L1 is connected to the collector of the first input transistor Z1 and to the anode of the fifth input diode D13. The cathode of the fifth input diode D13 is connected to the positive end of the first capacitor C1. The anodes of the second and fourth input diodes D2 and D4 are connected to the emitter of the first input transistor Z1 and to the negative end of the first capacitor C1.

The controller 12 includes a plurality of connections to the above described circuit that are described for the circuit in FIG. 3 as in the circuit of FIG. 1 as terminals. The first positive transistor terminals VGE1+ is connected to the gate of the first input transistor Z1 and the first negative transistor terminals VGE1− is connected to the emitter of the first input transistor Z1. The fifth, sixth, seventh and eighth positive transistor terminals VGE5+, VGE6+, VGE7+, and VGE8+ are connected to the gates of the first, second, third and fourth output transistors Z5, Z6, Z7 and Z8. The fifth, sixth, seventh and eighth negative transistor terminals VGE5−, VGE6−, VGE7−, and VGE8− are connected to the emitters of the first, second, third and fourth output transistors Z5, Z6, Z7 and Z8.

The voltage in terminal Vin is connected to the first input terminal IN1, the voltage out terminal Vout is connected to the third output terminal OUT3 and the signal common terminal SC is connected to the second input terminal IN2. The positive and negative current in terminals Iin+ and Iin− are connected to opposite ends of the secondary winding of the first current transducer CT1. The positive and negative current out terminals Iout+ and Iout− are connected to opposite ends of the secondary winding of the second current transducer CT1. The positive and negative first capacitor voltage terminals VC1+ and VC1− are connected to opposite ends of the secondary winding of the second inductor L2. The positive and negative transformer voltage terminals Vdc+ and Vdc− are connected to opposite ends of the primary winding of the transformer T1.

Figure 4:
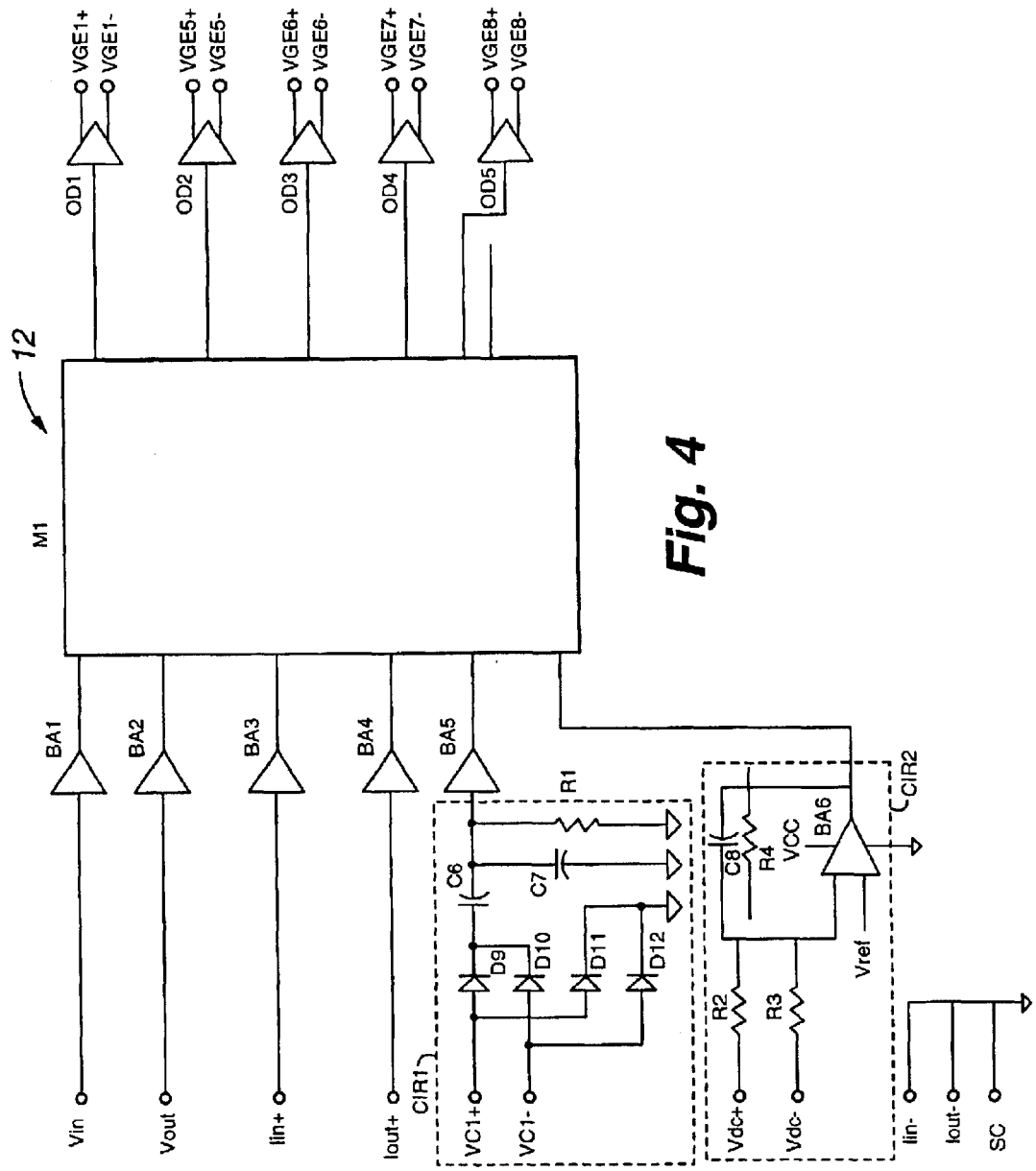
FIG. 4 is a detailed schematic circuit diagram of the controller of FIG. 3.

Referring to FIG. 4, controller 12 includes a microcontroller M1, first, second, third, fourth and fifth buffer amplifiers BA1, BA2, BA3, BA4 and BA5, a first input circuit CIR1, a second input circuit CIR2, and first, fifth, sixth, seventh and eighth output drivers OD1, OD5, OD6, OD7 and OD8. The input of the first buffer amplifier BA1 is connected to the voltage in terminal Vin and the output of the first buffer amplifier BA1 is connected to the microcontroller M1. The input of the second buffer amplifier BA2 is connected to the voltage out terminal Vout and the output of the second buffer amplifier BA2 is connected to the microcontroller M1.

The input of the third buffer amplifier BA3 is connected to the positive current in terminal Iin+ and the output of the third buffer amplifier BA3 is connected to the microcontroller M1. The input of the fourth buffer amplifier BA4 is connected to the positive current out terminal Iout+ and the output of the fourth buffer amplifier BA4 is connected to the microcontroller M1. The input of the fifth buffer amplifier BA5 is connected to the first input circuit CIR1 and the output of the fifth buffer amplifier BA5 is connected to the microcontroller M1.

The first input circuit CIR1 includes a first resistor R1, first, second, third and fourth controller diodes D9, D10, D11, D12, and sixth and seventh capacitors C6 and C7. The anode of the first controller diode D9 and the cathode of the third controller diode D11 are connected to the positive first capacitor voltage terminal VC1+, and the anode of the second controller diode D10 and the cathode of the fourth controller diode D12 are connected to the negative first capacitor voltage terminal VC1−. The sixth capacitor C6 is connected between the cathodes of the first and second controller diodes D9 and D10, and the input to the fifth buffer amplifier BA5. The anodes of the third and fourth controller diodes D11 and D12 are connected to ground. The seventh capacitor C7 and the first resistor R1 each connect between the input to the fifth buffer amplifier BA5 and ground.

The second input circuit CIR2 includes second, third and fourth resistors R2, R3 and R4, an eighth capacitor C8 and a sixth buffer amplifier BA6. One end of the second resistor R2 is connected to the positive transformer voltage terminal Vdc+ and one end of the third resistor R3 is connected to the negative transformer voltage terminal Vdc−. The other ends of the second and third resistors R2 and R3 are each connected to one end of the fourth resistor R4, one end of the eighth capacitor C8 and to the negative input of the sixth buffer amplifier BA6. The positive input of the sixth buffer amplifier BA6 is connected to Vref, and the controls of the sixth buffer amplifier BA6 are connected to Vcc and ground. The other ends of the fourth resistor R4 and the eighth capacitor C8, and the output of the sixth buffer amplifier BA6 are connected together to the microcontroller M1.

The inputs of the first, fifth, sixth, seventh and eighth output drivers OD1, OD5, OD6, OD7 and OD8 are each connected to the microcontroller M1. The positive outputs of the first, fifth, sixth, seventh and eighth output drivers OD1, OD5, OD6, OD7 and OD8 are connected to the first, fifth, sixth, seventh and eighth positive transistor terminals VGE1+, VGE5+, VGE6+, VGE7+, and VGE8+, respectively. The negative outputs of the first, fifth, sixth, seventh and eighth output drivers OD1, OD5, OD6, OD7 and OD8 are connected to the first, fifth, sixth, seventh and eighth negative transistor terminals VGE1−, VGE5−, VGE6−, VGE7−, and VGE8−, respectively. The negative current in terminal Iin−, the negative current out terminal Iout− and the signal common terminal SG are connected to ground.

The phase converter shown in FIGS. 3 and 4 functions in a similar fashion the phase converter shown in FIGS. 1 and 2, except that power cannot be fed back from the first capacitor C1 to the first and second input terminals IN1 and IN2. The first, second, third and fourth input diodes D1, D2, D3 and D4 form a full-wave rectifier. The first input transistor Z1 is PWM switched to, in combination with the first inductor L1, provide draw a sinusoidal input current from the first and second input terminals IN1 and IN2. The fifth input diode D13 prevents reverse current flow between the positive and negative ends of the first capacitor C1.

Figure 5:
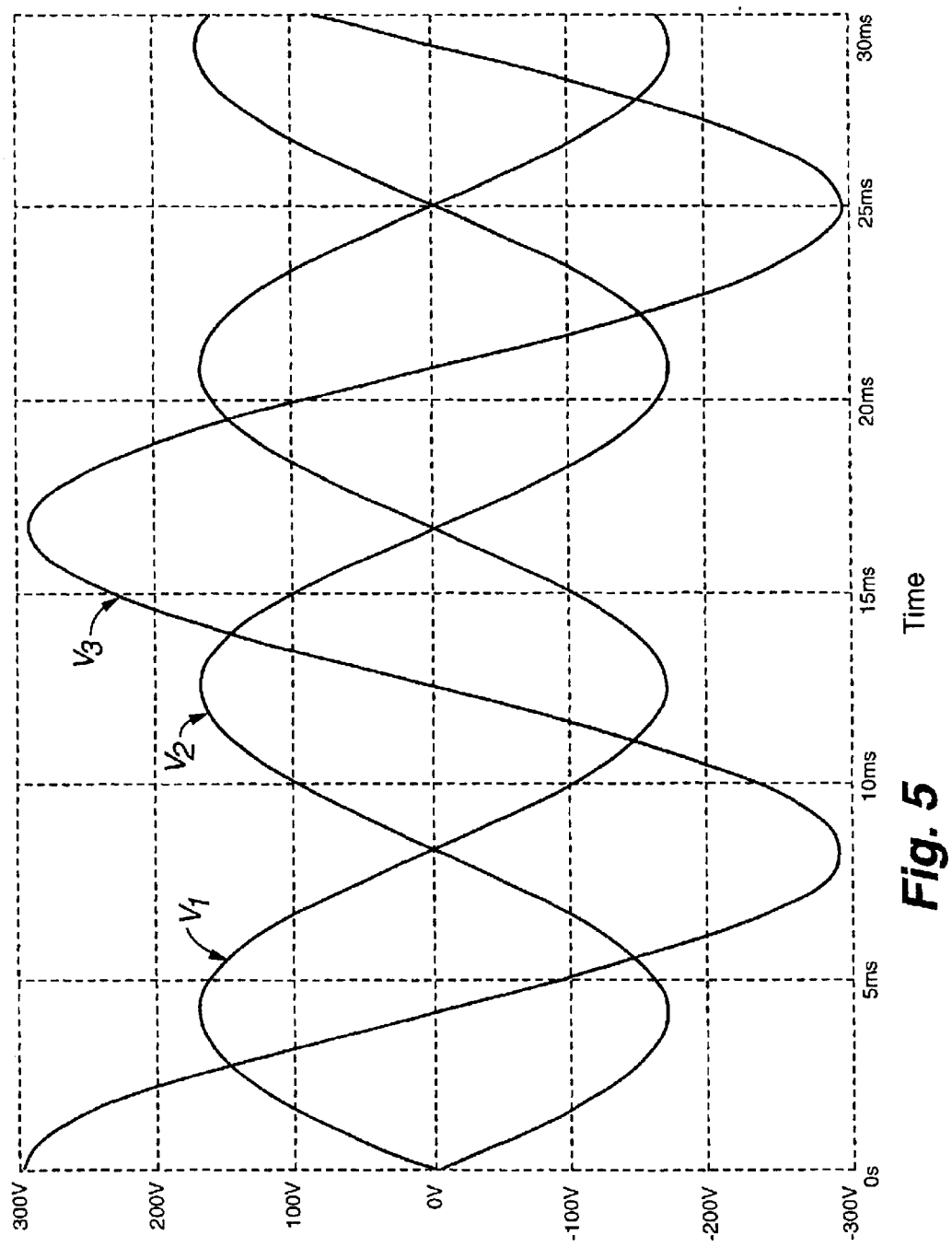
FIG. 5 is a graphical representation of the output voltages of the phase converter of the present invention.
Figure 6:
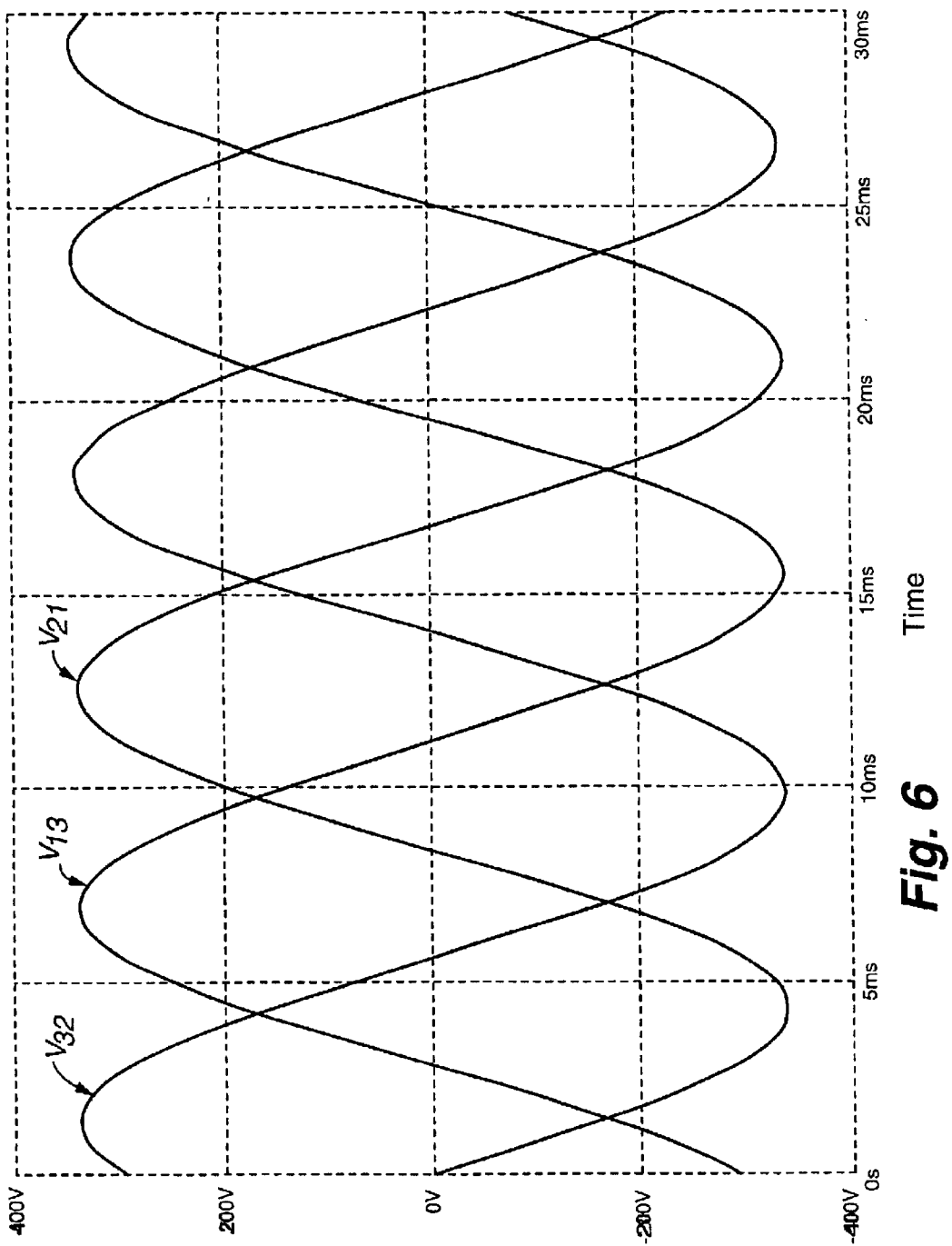
FIG. 6 is a graphical representation of the relative output voltages of the phase converter of the present invention.

FIG. 5 shows the voltages $V_1$, $V_2$ and $V_3$ at the first, second and third output terminals OUT1, OUT2 and OUT3, respectively, over a period of about 30 milliseconds for an input source of 240 VAC across the first and second input terminals IN1 and IN2. The voltages $V_1$ and $V_2$ are about 120 Vrms with a maximum amplitude of $120 \times \sqrt{2} = 170V$ and are 180 degrees out of phase. The maximum amplitude of voltage $V_3$ is $170 \times \sqrt{3} = 294V$ and voltage $V_3$ is 90 degrees out phase with $V_1$ and $V_2$. FIG. 6 shows these same voltages as the voltages $V_{32}$, $V_{13}$ and $V_{21}$ between the first, second and third output terminals OUT1, OUT2 and OUT3. In this way, by increasing the amplitude of the voltage at the third output terminal OUT3 and shifting the phase by 90 degrees, balanced three phase AC power is produced by the converter and supplied to the load.

The static phase converter of the present invention, unlike many prior known devices, does not require that the components be selected to match a specific load and provides balanced three phase AC power over a range of loads. This static phase converter is more efficient, less complex and less expensive than prior known inverters. This phase converter provides sinusoidal input current instead of highly peaked input current, preventing negative effects on the power grid. This phase converter can be used to supply power to inductive, capacitive or resistive loads.

The phase converter of the present invention does not require the voltage doubling required by the phase converter of U.S. Pat. No. 6,297,971, because the output H bridge 15 switches the output of the first capacitor C1. In the illustrated embodiment the output H bridge 15 switches the output of the first capacitor C1 by cyclically reversing the current direction through the primary winding of the transformer T1. The bus capacitor voltage in the present invention is half that of the prior version, and therefore switches with half the voltage rating can be used. Higher input voltages are possible with the same switches used in the prior version, or faster and less expensive switches can be used for the prior input voltage.

Although the present invention has been described with a certain degree of particularity, it is understood that the present disclosure has been made by way of example and that changes in details of structure may be made without departing from the spirit thereof.

What is claimed is:

1. A phase converter for converting single phase AC power to balanced three phase AC power comprising:

first and second input terminals, first, second and third output terminals for connection to a three phase load, said first output terminal being directly connected to said first input terminal and said second output terminal being directly connected to said second input terminal, a capacitor having a positive end and a negative end, first circuit means, connected to said first and second input terminals, to said positive end of said capacitor and to said negative end of said capacitor, for controllably charging said capacitor with a voltage, and second circuit means, connected to said positive end and to said negative end of said capacitor, and coupled to said third output terminal, for controllably discharging said capacitor while cyclically reversing voltage to said third output terminal between positive and negative, for supplying single phase AC power of a predetermined amplitude and phase, relative to the amplitude and phase of the power at said first and second output terminals, to said third output terminal, to result in balanced three phase AC power to said first, second and third output terminals.

2. The converter as set forth in claim 1 wherein said second circuit means includes an output H bridge, connected to said positive and negative ends of said capacitor, that cyclically couples said positive end of said capacitor to said third terminal and then said negative end of said capacitor to said third terminal.

3. The converter as set forth in claim 2 wherein said second circuit means includes an inductor and a transformer having a primary winding and a secondary winding, said inductor having a first end of connected to said output H bridge and a second end, said primary winding having a first end connected to said second end of said inductor and a second end connected to said output H bridge, and said secondary winding having a first end connected to said third terminal.

4. The converter as set forth in claim 3 wherein said output H bridge includes first, second, third and fourth output diodes each having an anode and a cathode and first, second, third and fourth output switches each having an input, an output and a control terminal, with said inputs of said first and third output switches and said cathodes of said first and third output diodes being connected to said positive end of said capacitor, said outputs of said second and fourth output switches and said anodes of said second and fourth output diodes being connected to said negative end of said capacitor, said output of said first output switch, said input of said second output switch, said anode of said first output diode and said cathode of said second output diode being connected to said first end of said inductor, and said output of said third output switch, said input of said fourth output switch, said anode of said third output diode and said cathode of said fourth output diode being connected to said second end of said primary winding of said transformer.

5. The converter as set forth in claim 4 including a controller, connected to said control terminals of said first, second, third and fourth output switches, that selectively pulse width modulation switches said first, second, third and fourth output switches.

6. The converter as set forth in claim 1 wherein said first circuit means includes an inductor having a first end connected to said first input terminal and a second end, and an input H bridge connected to said second end of said inductor, said second input terminal and said positive and negative ends of said capacitor.

7. The converter as set forth in claim 6 wherein said input H bridge includes first, second, third and fourth input diodes each having an anode and a cathode and first, second, third and fourth input switches each having an input, an output and a control terminal, with said output of said first input switch, said input of said second input switch, said anode of said first input diode and said cathode of said second diode being connected to said second end of said inductor, said output of said third input switch, said input of said fourth input switch, said anode of said third input diode and said cathode of said fourth input diode being connected to said second input terminal, said inputs of said first and third input switches and said cathodes of said first and third input diodes being connected to said positive end of said capacitor, and said outputs of said second and fourth input switches and said anodes of said second and fourth input diodes being connected to said negative end of said capacitor.

8. The converter as set forth in claim 7 including a controller, connected to said control terminals of said first, second, third and fourth input switches, that selectively pulse width modulation switches said first, second, third and fourth input switches.

9. The converter as set forth in claim 1 wherein said first circuit means includes an inductor having a first end and a second end, first, second, third, fourth and fifth input diodes each having an anode and a cathode and an input switch having an input, an output and a control terminal, with anode of said first input diode and said cathode of said third input diode being connected to said first input terminal, said anode of said second input diode and said cathode of said fourth input diode being connected to said second input terminal, said cathodes of said first and second input diodes being connected to said first end of said inductor, said input of said input switch and said second end of said inductor being connected to said anode of said fifth input diode, said cathode of said fifth input diode being connected to said positive end of said capacitor, and said anodes of said third and fourth input diodes and said output of said switch being connected to said negative end of said capacitor.

10. The converter as set forth in claim 9 including a controller, connected to said control terminal said input switch, that selectively pulse width modulation switches said input switch.

11. A phase converter for converting single phase AC power to balanced three phase AC power comprising:

first and second input terminals, first, second and third output terminals for connection to a three phase load, said first output terminal being directly connected to said first input terminal and said second output terminal being directly connected to said second input terminal, a capacitor having a positive end and a negative end, a first inductor having a first end, connected to said first input terminal, and a second end, an input H bridge including first, second, third and fourth input diodes each having an anode and a cathode, and first, second, third and fourth input switches each having an input, an output and a control terminal, with said output of said first input switch, said input of said second input switch, said anode of said first input diode and said cathode of said second diode being connected to said second end of said first inductor, said output of said third input switch, said input of said fourth input switch, said anode of said third input diode and said cathode of said fourth input diode being connected to said second input terminal, said inputs of said first and third input switches and said cathodes of said first and third input diodes being connected to said positive end of said capacitor, and said outputs of said second and fourth input switches and said anodes of said second and fourth input diodes being connected to said negative end of said capacitor a second inductor having a first end and a second end, a transformer having a primary winding, and a secondary winding, said primary winding having a first end connected to said first end of said second inductor and a second end, said secondary winding having a first end connected to said third output terminal and a second end, an output H bridge including first, second, third and fourth output diodes each having an anode and a cathode, and first, second, third and fourth output switches each having an input, an output and a control terminal, with said inputs of said first and third output switches and said cathodes of said first and third output diodes being connected to said positive end of said capacitor, said outputs of said second and fourth output switches and said anodes of said second and fourth output diodes being connected to said negative end of said capacitor, said output of said first output switch, said input of said second output switch, said anode of said first output diode and said cathode of said second output diode being connected to said first end of said second inductor, and said output of said third output switch, said input of said fourth output switch, said anode of said third output diode and said cathode of said fourth output diode being connected to said second end of said primary winding of said transformer, and a controller, connected to said control terminals of said first, second, third and fourth input switches and said first, second, third and fourth output switches, that selectively pulse width modulation switches said first, second, third and fourth input switches and said first, second, third and fourth output switches.

12. A phase converter for converting single phase AC power to balanced three phase AC power comprising:

first and second input terminals, first, second and third output terminals for connection to a three phase load, said first output terminal being directly connected to said first input terminal and said second output terminal being directly connected to said second input terminal, a capacitor having a positive end and a negative end, first, second, third and fourth input diodes each having an anode and a cathode, with said anode of said first input diode and said cathode of said third input diode being connected to said first input terminal, said anode of said second input diode and said cathode of said fourth input diode being connected to said second input terminal, and said anodes of said third and fourth input diodes being connected to said negative end of said capacitor, a first inductor having a first end and a second end, with said first end of said first inductor being connected to said cathodes of said first and second input diodes, an input switch having an input, an output and a control terminal, with said output of said switch being connected to said negative end of said capacitor a fifth input diode having an anode and a cathode, said anode of said fifth input diode being connected to said input of said input switch and said second end of said inductor, said cathode of said fifth input diode being connected to said positive end of said capacitor, a second inductor having a first end and a second end, a transformer having a primary winding, and a secondary winding, said primary winding having a first end connected to said first end of said second inductor and a second end, said secondary winding having a first end connected to said third output terminal and a second end, an output H bridge including first, second, third and fourth output diodes each having an anode and a cathode, and first, second, third and fourth output switches each having an input, an output and a control terminal, with said inputs of said first and third output switches and said cathodes of said first and third output diodes being connected to said positive end of said capacitor, said outputs of said second and fourth output switches and said anodes of said second and fourth output diodes being connected to said negative end of said capacitor, said output of said first output switch, said input of said second output switch, said anode of said first output diode and said cathode of said second output diode being connected to said first end of said second inductor, and said output of said third output switch, said input of said fourth output switch, said anode of said third output diode and said cathode of said fourth output diode being connected to said second end of said primary winding of said transformer, and a controller, connected to said control terminals of said input switch and said first, second, third and fourth output switches, that selectively pulse width modulation switches said input switch and said first, second, third and fourth output switches.

\* \* \* \* \*